G. B. MARKHAM.
Grain-Drill.
No. 26,690. Patented Jan. 3, 1860.
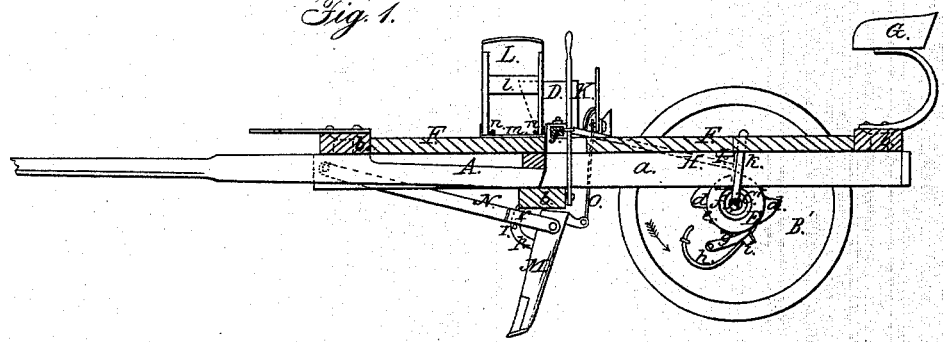
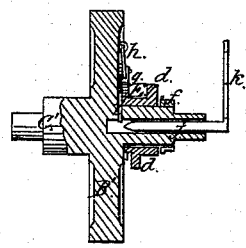
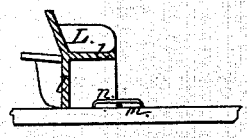
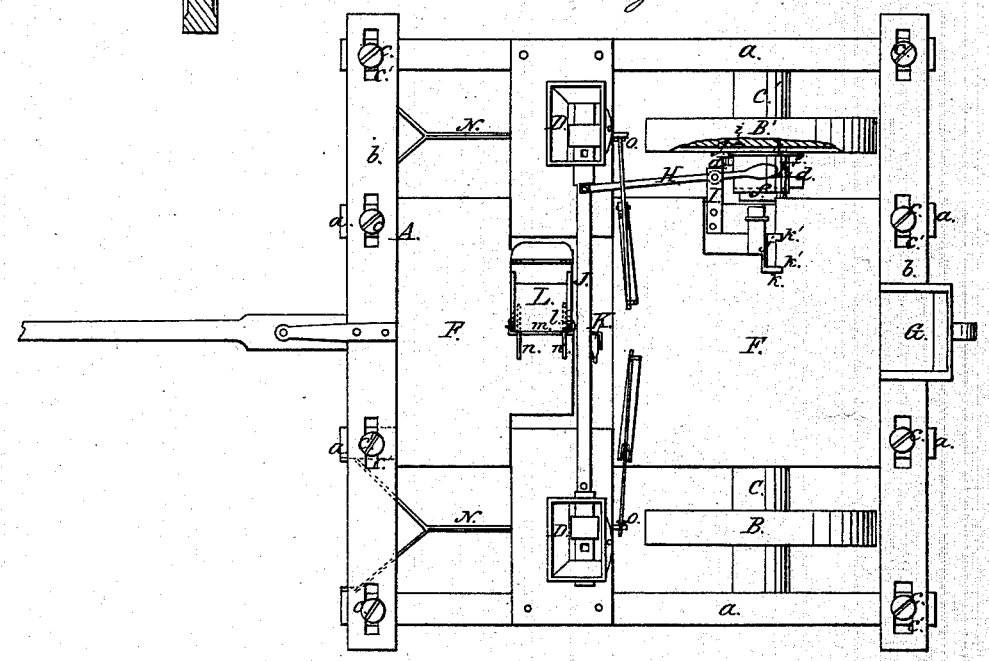
Witnesses:
Wm. Hunter
W. D. Whalen
Inventor:
George B. Markham

UNITED STATES PATENT OFFICE.

GEORGE B. MARKHAM, OF MEAD'S MILLS, MICHIGAN.

IMPROVEMENT IN SEEDING-MACHINES.

Specification forming part of Letters Patent No. 26,690, dated January 3, 1860.

*To all whom it may concern:*

Be it known that I, GEORGE B. MARKHAM, of Mead's Mills, in the county of Wayne and State of Michigan, have invented a new and Improved Seeding-Machine; and I do hereby declare that the following is a full, clear, and exact description of the same, reference being had to the accompanying drawings, in which—

Figure 1 represents a longitudinal vertical section of this invention. Fig. 2 is a plan or top view of same. Fig. 3 is a transverse vertical section of the driving-wheel. Fig. 4 is a detached vertical section of the dropper's seat.

Similar letters of reference in the several figures refer to corresponding parts.

This invention consists, first, in a particular arrangement of parts whereby the driving-wheel can be thrown out of gear instantaneously, and at the same time the machine is allowed to back without effect on or injury to the dropping mechanism.

It also consists in arranging the dropper's seat in front of the machine in such a manner that the same can be reversed so as to face either way, whereby the dropper is enabled to see the rows both ways and to drop at the desired moment.

To enable those skilled in the art to make and use my invention, I will proceed to describe it.

The frame A of my machine is constructed of longitudinal timbers $a$, to which the cross-timbers $b$ are fastened by means of screws $c$, that work into slots $c'$, so that the width of the frame can be adjusted according to the width of the rows to be planted. The frame is supported by wheels B B', which are attached to separate axles, C C', and which are placed right behind the center of the hoppers D, so that the corn as it drops from the hoppers is pressed into the ground and covered up by the action of the wheels.

Placed loosely on the axle C' of the wheel B' is a sleeve, E, and attached to this sleeve are two cams, $d$, and a ratchet-wheel, $e$. The sleeve is confined on the axle between the wheel on one side and between a ring, $f$, on the other side, which latter is firmly driven on the end of the axle; and it (the sleeve) is prevented from turning in one direction by a pawl, $g$, that is forced into the teeth of the ratchet-wheel $e$ by means of a light spring, $h$. The pawl $g$ is secured to the wheel B', and the teeth of the ratchet-wheel are so arranged that when said wheel turns in the direction of the arrow marked on it the sleeve is caused to rotate with the wheel; but if the wheel turns in the opposite direction, the pawl slides over the teeth of the ratchet-wheel and the sleeve remains stationary. Behind the pawl $g$, and mortised into the side of the wheel, is a small dog, $i$, and a pointed rod, $j$, extends through the hole in the center of the axle C', close to the dog $i$. By pushing in said rod the dog is raised, and the pawl $g$ is thrown out of gear with the teeth of the ratchet-wheel, and the wheel B' turns independent from the sleeve E. The rod $j$ is operated by a handle, $k$, that is forced into notches $k'$ on the inside of the platform F, and which can be reached and operated by the foot from the driver's seat G. The cams $d$ act on the flat-pointed end of a vibrating lever, H, which is fulcrated in a pendant, I, and the other end of which is pivoted to the seed-slide J. Each of said cams gives one throw of corn as it strikes the lever H, and by increasing the number of these cams the number of hills planted for each revolution of the wheels B B' can be increased. If it is desired, however, to plant in rows both ways, the lever H must be taken out, and the seed-slide is now operated by the hand-lever K from a seat, L, which I denominate the "dropper's seat," and which is arranged on the front part of the platform F. This seat is provided with two bottoms, $l l'$, and it is hinged to the platform by means of a rod, $m$, in such a manner that either one of the bottoms $l$ or $l'$ can be brought in a horizontal position, so that the dropper can be made to face either way. The rod $m$ has a sliding motion in two staples, $n$, allowing the seat to be brought in a convenient position for the dropper to operate the lever K. By this arrangement of the seat the dropper is enabled to see the rows both ways, and to drop the seed at the proper intervals.

The seed from the hopper is discharged into tubes M, the lower end of which forms the hoes for the purpose of drawing the furrows to receive the seed. These hoes are suspended from bars $o$, which serve to raise and lower the same, and they are hinged to forked rods N, that are pivoted to the longitudinal timbers $a$, allowing said hoes to rise and fall at pleasure. Attached to the upper part of said hoes are the arms p, which bend upward, extending between the forked ends of the rods N, and the vertical parts of these arms are furnished with holes r, that serve to regulate the angle at which the hoes cut into the ground.

This machine is equally applicable to plant in drills and in check-rows. It can be used in different sorts of ground, and the dropping mechanism is not injured if the machine is backed.

What I claim as new, and desire to secure by Letters Patent, is—

1. The arrangement of the sleeve E on the axle of the driving-wheel with the ratchet-wheel e and cams d, or their equivalents, in combination with the pawl g, dog i, and pointed rod j, or its equivalent, substantially in the manner and for the purpose specified.

2. The arrangement of the reversible seat L, with two bottoms, l l', substantially as described, in combination with the hand-lever K and seed-slide J, whereby the dropper is enabled to face the rows in whatever direction the machine may run, and to adjust the seat to a convenient position for operating the lever.

GEORGE B. MARKHAM.

Witnesses:
M. D. WHALEN,
WM. HUNTER.